(12) United States Patent
Bonwick

(10) Patent No.: US 11,119,856 B2
(45) Date of Patent: Sep. 14, 2021

(54) METHOD AND SYSTEM FOR MULTI-DIMENSIONAL RAID

(71) Applicant: EMC IP Holding Company LLC, Hopkinton, MA (US)

(72) Inventor: Jeffrey S. Bonwick, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/060,946

(22) Filed: Oct. 1, 2020

(65) Prior Publication Data

US 2021/0049069 A1 Feb. 18, 2021

Related U.S. Application Data

(63) Continuation of application No. 15/087,445, filed on Mar. 31, 2016, now abandoned, which is a
(Continued)

(51) Int. Cl.
*G06F 11/00* (2006.01)
*G06F 11/10* (2006.01)
*G06F 3/06* (2006.01)

(52) U.S. Cl.
CPC .......... *G06F 11/1076* (2013.01); *G06F 3/064* (2013.01); *G06F 3/0619* (2013.01);
(Continued)

(58) Field of Classification Search
CPC ............... G06F 11/1057; G06F 11/108; G06F 11/1076; G06F 11/1096
See application file for complete search history.

(56) References Cited

U.S. PATENT DOCUMENTS

| 5,708,668 A | 1/1998 | Styczinski |
| 6,351,838 B1 | 2/2002 | Amelia |

(Continued)

FOREIGN PATENT DOCUMENTS

| CN | 101604267 A | 12/2009 |
| CN | 101980137 A | 2/2011 |

(Continued)

OTHER PUBLICATIONS

Akber Kazmi; "PCI Express™ Basics & Applications in Communication Systems"; PCI-SIG Developers Conference 2004; 50 pages.
(Continued)

*Primary Examiner* — Marc Duncan
(74) *Attorney, Agent, or Firm* — Chamberlain, Hrdlicka, White, Williams & Aughtry

(57) ABSTRACT

A method for storing data. The method includes receiving data to write to persistent storage, calculating parity values for a grid using the data, where each of the parity values is associated with one selected from of the Row Q Parity Group, the Row P Parity Group, the Column Q Parity Group, the Column P Parity Group, and the Intersection Parity Group. The method further includes writing the data to a data grid in the persistent storage, where the data grid is part of the grid, and writing the parity values for the grid to a portion of the grid, where the portion of the grid comprises physical locations associated with a Row Q Parity Group, a Row P Parity Group, a Column Q Parity Group, a Column P Parity Group, and an Intersection Parity Group, wherein the portion of the grid is distinct from the data grid.

20 Claims, 17 Drawing Sheets

Related U.S. Application Data continuation of application No. 14/387,326, filed as application No. PCT/US2013/033224 on Mar. 21, 2013, now Pat. No. 9,513,994, which is a continuation of application No. 13/428,536, filed on Mar. 23, 2012, now Pat. No. 8,327,185.

(52) U.S. Cl.
CPC .......... *G06F 3/0689* (2013.01); *G06F 11/108* (2013.01); *G06F 11/1096* (2013.01); *G06F 2211/1057* (2013.01)

(56) References Cited

U.S. PATENT DOCUMENTS

| | | | |
|---|---|---|---|
| 6,415,355 B1 | 7/2002 | Hirofuji | |
| 7,398,418 B2 | 7/2008 | Soran et al. | |
| 7,406,621 B2 | 7/2008 | Lubbers et al. | |
| 7,430,706 B1 | 9/2008 | Yuan et al. | |
| 7,543,100 B2 | 6/2009 | Singhal et al. | |
| 7,644,197 B1 | 1/2010 | Waldorf et al. | |
| 7,752,389 B1 | 7/2010 | Fan | |
| 7,934,120 B2 | 4/2011 | Zohar et al. | |
| 8,078,906 B2 | 12/2011 | Yochai et al. | |
| 8,145,840 B2 | 3/2012 | Koul et al. | |
| 8,200,887 B2 | 6/2012 | Bennett | |
| 8,234,445 B2 | 7/2012 | Chou et al. | |
| 8,289,641 B1 | 10/2012 | Emami | |
| 8,316,260 B1 | 11/2012 | Bonwick | |
| 8,327,185 B1 | 12/2012 | Bonwick | |
| 8,352,425 B2 | 1/2013 | Bourbonnais et al. | |
| 8,448,021 B1 | 5/2013 | Bonwick | |
| 8,464,095 B1 | 6/2013 | Bonwick | |
| 8,489,979 B2 | 7/2013 | Rub | |
| 8,554,997 B1 | 10/2013 | Bonwick et al. | |
| 8,560,772 B1 | 10/2013 | Piszczek et al. | |
| 8,572,460 B2 * | 10/2013 | Wang | H04L 1/0064 714/758 |
| 8,719,520 B1 | 5/2014 | Piszczek et al. | |
| 8,725,931 B1 | 5/2014 | Kang | |
| 8,782,505 B2 | 7/2014 | Rub | |
| 8,843,782 B2 | 9/2014 | Guan | |
| 8,924,776 B1 | 12/2014 | Mollov et al. | |
| 8,977,942 B2 | 3/2015 | Wu et al. | |
| 9,021,183 B2 | 4/2015 | Matsuyama et al. | |
| 9,152,499 B1 | 10/2015 | Mollov et al. | |
| 9,529,674 B2 | 12/2016 | Pereira et al. | |
| 9,552,242 B1 | 1/2017 | Leshinsky et al. | |
| 9,760,493 B1 | 9/2017 | Wang | |
| 10,095,414 B2 | 10/2018 | Zettsu et al. | |
| 2002/0161972 A1 | 10/2002 | Talagala et al. | |
| 2003/0093740 A1 | 5/2003 | Stojanovic | |
| 2004/0153961 A1 | 8/2004 | Park et al. | |
| 2004/0177219 A1 | 9/2004 | Meehan et al. | |
| 2004/0225926 A1 | 11/2004 | Scales et al. | |
| 2005/0166083 A1 | 7/2005 | Frey et al. | |
| 2005/0223156 A1 | 10/2005 | Lubbers et al. | |
| 2005/0229023 A1 | 10/2005 | Lubbers et al. | |
| 2006/0085594 A1 | 4/2006 | Roberson et al. | |
| 2006/0112261 A1 | 5/2006 | Yourst et al. | |
| 2006/0190243 A1 | 8/2006 | Barkai et al. | |
| 2007/0061383 A1 | 3/2007 | Ozawa et al. | |
| 2008/0109602 A1 | 5/2008 | Ananthamurthy et al. | |
| 2008/0120484 A1 | 5/2008 | Zhang et al. | |
| 2008/0168225 A1 | 7/2008 | O'Connor | |
| 2009/0187786 A1 | 7/2009 | Jones et al. | |
| 2010/0005364 A1 | 1/2010 | Higurashi et al. | |
| 2010/0082540 A1 | 4/2010 | Isaacson et al. | |
| 2010/0199125 A1 | 8/2010 | Reche | |
| 2011/0055455 A1 | 3/2011 | Post et al. | |
| 2011/0258347 A1 | 10/2011 | Moreira et al. | |
| 2012/0030425 A1 | 2/2012 | Becker-Szendy et al. | |
| 2012/0042224 A1 * | 2/2012 | Wu | G06F 11/1068 714/755 |
| 2012/0079318 A1 | 3/2012 | Colgrove et al. | |
| 2012/0089778 A1 | 4/2012 | Au et al. | |
| 2012/0166712 A1 | 6/2012 | Lary | |
| 2012/0297118 A1 | 11/2012 | Gorobets et al. | |
| 2012/0303576 A1 | 11/2012 | Calder et al. | |
| 2012/0324156 A1 | 12/2012 | Muralimanohar et al. | |
| 2013/0151754 A1 | 6/2013 | Post et al. | |
| 2013/0185735 A1 | 7/2013 | Farrell et al. | |
| 2014/0359608 A1 | 12/2014 | Tsirkin et al. | |
| 2015/0324387 A1 | 11/2015 | Squires | |
| 2016/0132432 A1 | 5/2016 | Shen et al. | |
| 2016/0148708 A1 | 5/2016 | Tuers et al. | |
| 2016/0210060 A1 | 7/2016 | Dreyer | |
| 2016/0239345 A1 | 8/2016 | Rachlin | |
| 2016/0239421 A1 | 8/2016 | Abraham et al. | |
| 2016/0320986 A1 | 11/2016 | Bonwick | |
| 2017/0124327 A1 | 5/2017 | Kumbhar et al. | |
| 2017/0192889 A1 | 7/2017 | Sato et al. | |
| 2017/0255405 A1 | 9/2017 | Zettsu et al. | |
| 2017/0285945 A1 | 10/2017 | Kryvaltsevich | |
| 2017/0300249 A1 | 10/2017 | Geml et al. | |
| 2017/0329675 A1 | 11/2017 | Berger et al. | |
| 2017/0351604 A1 | 12/2017 | Tang et al. | |
| 2018/0032333 A1 | 2/2018 | Sullivan | |
| 2018/0150326 A1 | 5/2018 | Xia et al. | |
| 2018/0267897 A1 | 9/2018 | Jeong | |

FOREIGN PATENT DOCUMENTS

| | | |
|---|---|---|
| CN | 101980137 B | 5/2012 |
| CN | 103019617 A | 4/2013 |
| CN | 103577111 A | 2/2014 |
| CN | 103902465 A | 7/2014 |
| CN | 104871138 A | 8/2015 |
| EP | 1577774 A2 | 9/2005 |
| JP | 2004-326759 A | 11/2004 |
| JP | 2010-508604 A | 3/2010 |
| WO | 2008/054760 A2 | 9/2009 |

OTHER PUBLICATIONS

Amber Huffman; "NVM Express: Revision 1.0b"; Jul. 12, 2011, 126 pa.ges.

Definition: time slice; IBM Knowledgebase; Scheduler processor time slice; https://www.ibm.com/support/knowledgecenter/en/ssw_aix_72/performance/sched_proc_time_slice.html; retrieved Jun. 11, 2019. 2 pages.

Definition: time slice; Microsoft Computer Dictionary, Fifth Edition; p. 656; 2015; ISBN: 0735614954, 1 page.

Definition: time slice; Wikipedia; https://en.wikipedia.org/wiki/Preemption_(computing); retrieved Jun. 11, 2019, 3 pages.

Derek Percival; "Multicast Over PCI Express®," PCI-SIG Developers Conference Europe; 2009, 33 pages.

H. Peter Anvin; "The mathematics of RAID-6"; http://kernel.org/pub/linux/kernel/people/hpa/raid6.pdf (last visited Nov. 15, 2017), 9 pages.

Jack Regula; "Using Non-transparent Bridging in PCI Express Systems"; PLX Technology, Inc.; Jun. 1, 2004 (31 pages), 31 pages.

Minoru Uehara; "Orthogonal RAID with Multiple Parties in Virtual Large-Scale Disks"; IPSJ SIG Technical Report 2011 (H23); vol. 2011-DPS-149; No. 4; 2011, 8 pages.

* cited by examiner

Value for <1,1,4> RAID gird location =
f (value at <1,1,1>, value at <1,1,2> value at <1,1,3>)

Value for <1,1,5> RAID gird location =
f (value at <1,1,1>, value at <1,1,2>, value at <1,1,3>)

METHOD AND SYSTEM FOR MULTI-DIMENSIONAL RAID

CROSS-REFERENCE TO RELATED APPLICATIONS

This application is a continuation of U.S. patent application Ser. No. 15/084,445. U.S. patent application Ser. No. 15/084,445 is a continuation of U.S. patent application Ser. No. 14/387,326. U.S. patent application Ser. No. 14/387,326 is a national phase application of WIPO Patent Application No. PCT/US2013/033224. WIPO Patent Application No. PCT/US2013/033224 claims priority to U.S. patent application Ser. No. 13/428,536 filed on Mar. 23, 2012, entitled "METHOD AND SYSTEM FOR MULTI-DIMENSIONAL RAID." U.S. patent application Ser. No. 15/084,445, U.S. patent application Ser. No. 14/387,326, WIPO Patent Application No. PCT/US2013/033224, and U.S. patent application Ser. No. 13/428,536 are hereby each incorporated by reference in their entirety.

BACKGROUND

In order to protect against potential loss of data in a storage system, it is often advantageous to implement a replication scheme. Current replication schemes are only able to sustain a limited amount of error before data within the storage system is unable to be read.

SUMMARY

In general, in one aspect, the invention relates to a method for storing data. The method includes receiving a request to write data, in response the request, selecting, a RAID grid location in a RAID grid to write the data, writing the data to memory, wherein the data is temporarily stored in the memory, updating a data structure to indicate that the RAID grid location is filled, determining, using the data structure, whether a data grid in the RAID grid is filled, wherein the RAID grid location is in the data grid, based on a determination that the data grid is filled: calculating parity values for the RAID grid using the data, determining a physical address in persistent storage corresponding to the RAID grid location, writing the data to a physical location in persistent storage corresponding to the physical address, and writing the parity values to the persistent storage.

In general, in one aspect, the invention relates to a method for reconstructing data. The method includes receiving a request for first data, obtaining the first data, wherein the first data is obtained from a first physical location in persistent storage and wherein the first physical location is associated with a first physical address, making a first determination that the first data is one selected from a group consisting of corrupted and not obtained, based on the first determination: identifying a first RAID grid location corresponding to the first physical address, identifying that a first RAID grid is associated with the first RAID grid location, identifying a RAID cube associated with the first RAID grid, wherein the RAID cube comprises the first RAID grid and a second RAID grid, making a first attempt to reconstruct the first data using at least one value in the first RAID grid, wherein the first attempt fails, making a second attempt, after the first attempt fails, to reconstruct the first data using at least one value in the second RAID grid, wherein the second attempt is successful, and providing the reconstructed first data to the client.

In general, in one aspect, the invention relates to a method for reconstructing data. The method includes receiving a request for data, obtaining the data, wherein the data is obtained from a physical location in persistent storage and wherein the physical location is associated with a physical address, making a first determination that the first data is one selected from a group consisting of corrupted and not obtained, based on the first determination: identifying a first RAID grid location corresponding to the physical address, identifying that a RAID grid is associated with the first RAID grid location, making a first attempt to reconstruct the data using a first value in a second RAID grid location, wherein the second RAID grid location is located in at least one selected from a group consisting of a first row and a first column in the RAID grid, wherein the first RAID grid location is part of the first row and the first column, wherein the first attempt fails, making a second attempt, after the first attempt fails, to reconstruct the data, wherein the second attempt is successful and wherein the second attempt comprises: reconstructing at least one selected from a group consisting of a second row and a second column in the RAID grid to obtain a reconstructed portion of the RAID grid, wherein the reconstructed portion of the RAID grid intersects at least one selected from a group consisting of the first row and the first column, reconstructing the data using a second value in a third RAID grid location, wherein the third RAID grid location is part of the reconstructed portion of the RAID grid, and wherein the third RAID grid location is located in one selected from a group consisting of the first row and first column, and providing the reconstructed data to the client.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-9D, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for replicating data using a multi-dimensional RAID scheme. More specifically, embodiments of the invention provide a method and system for implementing a 2D RAID scheme and a 3D RAID scheme.

Using a 2D RAID scheme, the data stored within a RAID grid implementing such a RAID scheme may be recovered when there are more than two errors in a given RAID stripe. Similarly, using a 3D RAID scheme, the data stored within a RAID cube implementing such a RAID scheme may be recovered when there are more than two errors in a given RAID stripe. Further, in various embodiments of the invention, all data is to be recovered when there is a failure in more than one independent fault domain (IFD).

In one or more embodiments of the invention, an IFD corresponds to a failure mode which results in the data at a given location being inaccessible. Each IFD corresponds to an independent mode of failure in the storage array. For example, if the data is stored in NAND flash, where the NAND flash is part of a storage module (which includes multiple NAND dies), then the IFDs may be (i) storage module, (ii) channel (i.e., the channel used by the storage module controller (not shown) in the storage module to write data to the NAND flash), and (iii) NAND die.

Figure 2:
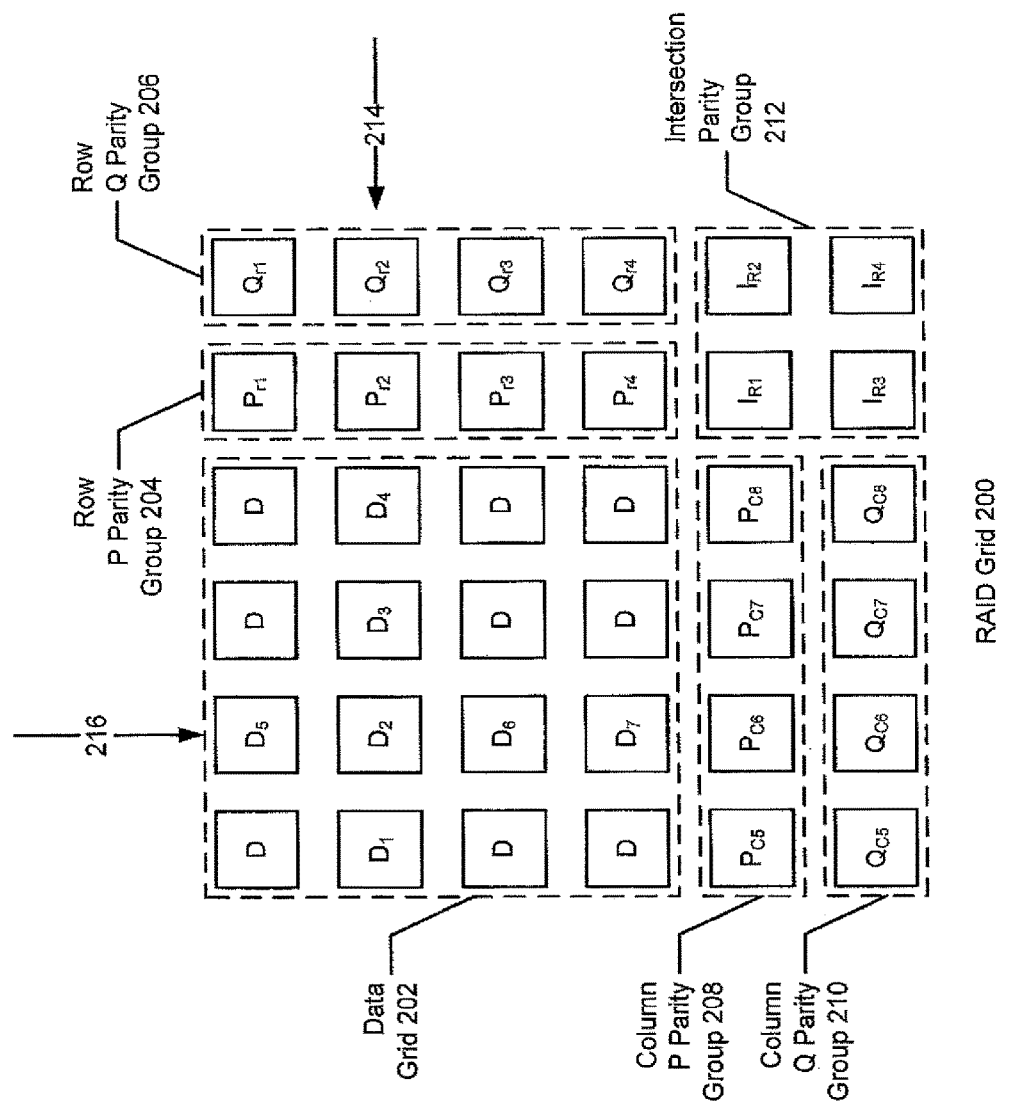
FIG. 2 shows a RAID grid in accordance with one embodiment of the invention.
Figure 3:
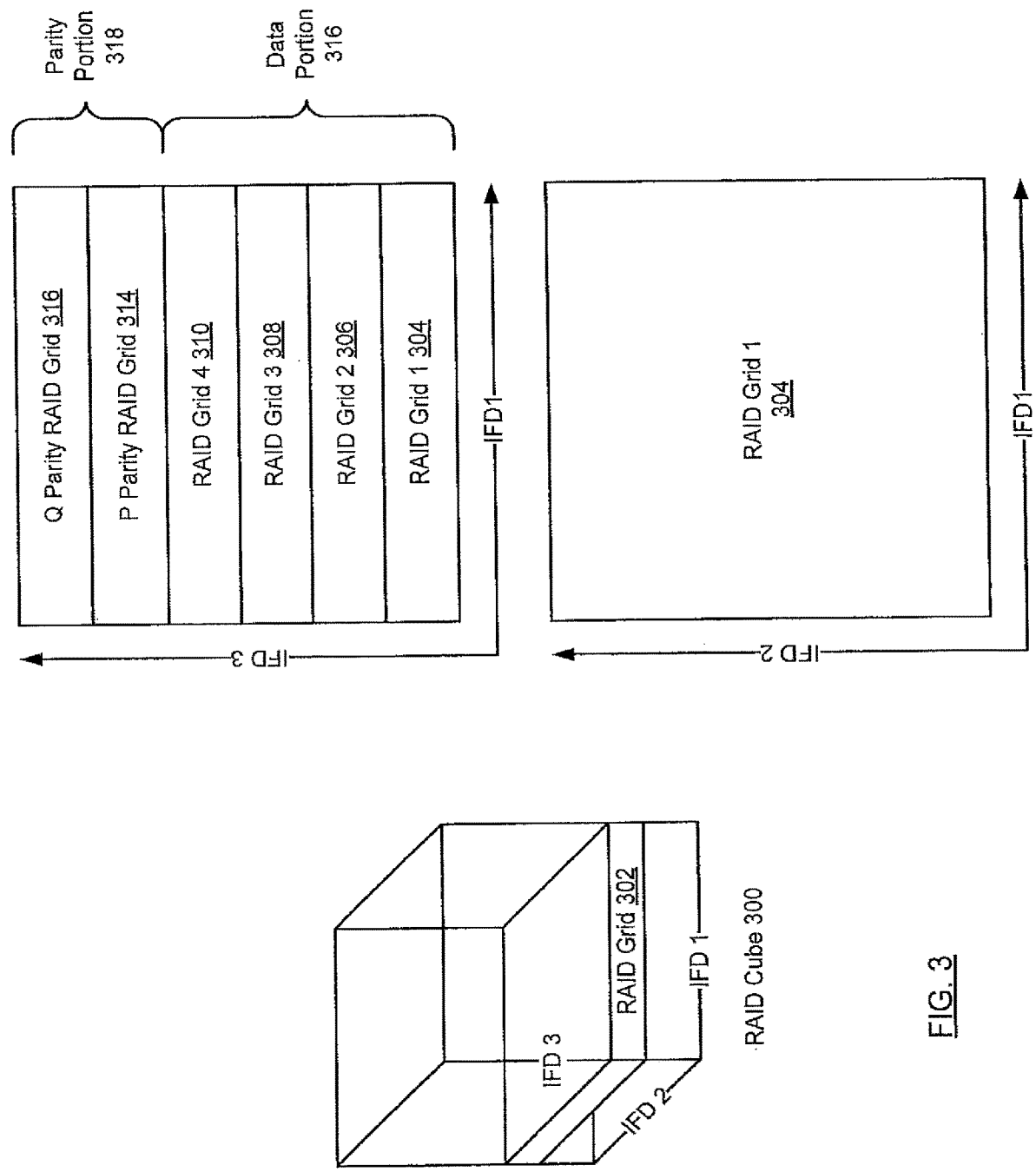
FIG. 3 shows a RAID cube and various view of the RAID cube in accordance with one embodiment of the invention.
Figure 4:
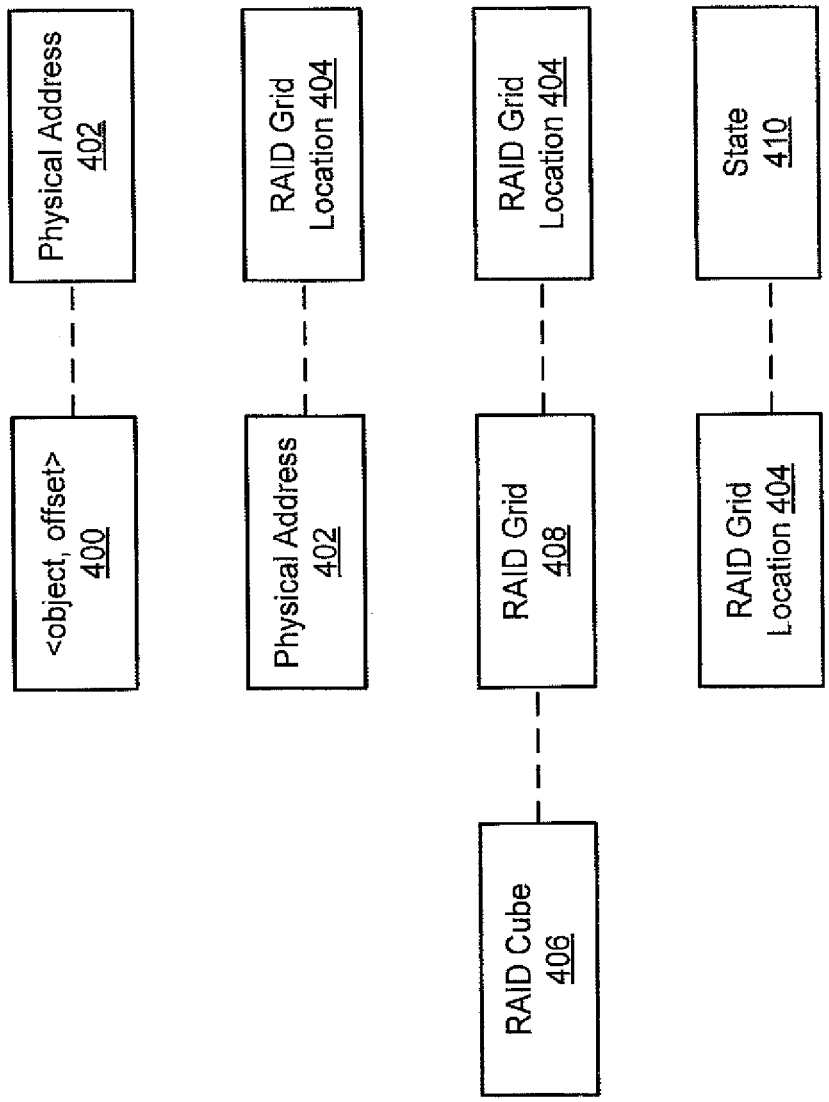
FIG. 4 shows a data structures in accordance with one embodiment of the invention.

For purposes of this invention, the term "RAID" as used herein refers to "Redundant Array of Independent Disks." While "RAID" refers to any array of independent disks, embodiments of the invention may be implemented using any type of persistent storage device where the RAID grid locations (see e.g., FIG. 2) may be distributed across one or more persistent storage devices based on the implementation of the invention (see e.g., FIGS. 3 and 4).

Figure 1:
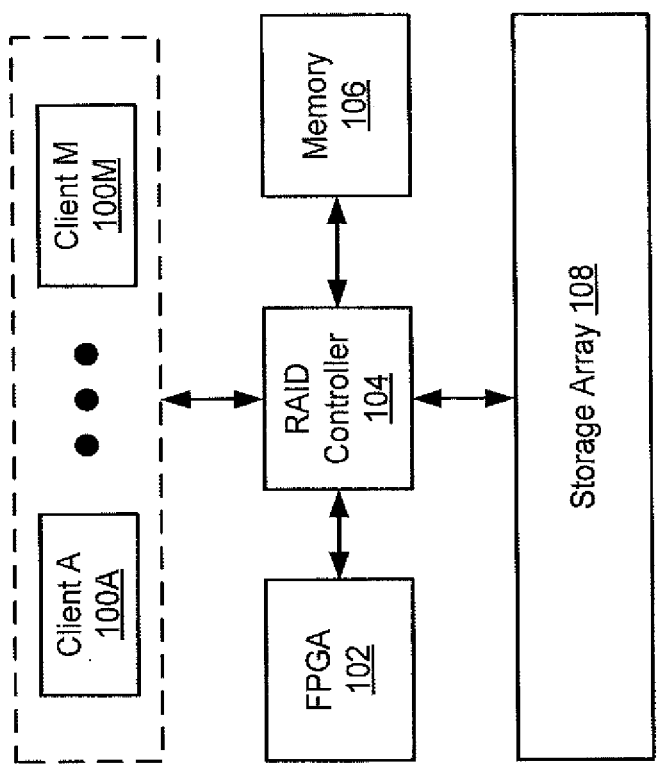
FIG. 1 shows a system in accordance with one embodiment of the invention.

FIG. 1 shows a system in accordance with one embodiment of the invention. As shown in FIG. 1, the system includes one or more clients (100A, 100M), a RAID controller (104), memory (106), optionally an FPGA (102), and a storage array (108).

In one embodiment of the invention, a client (100A, 100M) is any system or process executing on a system that includes functionality to issue a read request or a write request to the RAID controller (104). In one embodiment of the invention, the clients (100A, 100M) may each include a processor (not shown), memory (not shown), and persistent storage (not shown). In one embodiment of the invention, the RAID controller (104) is configured to implement the multi-dimensional RAID scheme, which includes writing data to the storage array in a manner consistent with the multi-dimensional RAID scheme (see FIGS. 5A-5C) and reading data (including reconstructing data) from the storage array in a manner consistent with the multi-dimensional RAID scheme (see FIG. 8). In one embodiment of the invention, the RAID controller (104) includes a processor configured to execute instructions to implement one or more embodiments of the invention, where the instructions are stored on a non-transitory computer readable medium (not shown) that is located within or that is operatively connected to the RAID controller (104). Alternatively, the RAID controller (104) may be implemented using hardware. Those skilled in the art will appreciate that the RAID controller (104) may be implemented using any combination of software and/or hardware.

In one embodiment of the invention, the RAID controller (104) is operatively connected to memory (106). The memory (106) may be any volatile memory including, but not limited to, Dynamic Random-Access Memory (DRAM), Synchronous DRAM, SDR SDRAM, and DDR SDRAM. In one embodiment of the invention, the memory (106) is configured to temporarily store various data (including parity data) prior to such data being stored in the storage array.

In one embodiment of the invention, the FPGA (102) (if present) includes functionality to calculate P and/or Q parity information for purposes of storing data in the storage array (108) and/or functionality to perform various calculations necessary to recover corrupted data stored using the multi-dimensional RAID scheme. The RAID controller (104) may use the FPGA (102) to offload the processing of various data in accordance with one or more embodiments of the invention. In one embodiment of the invention, the storage array (108) includes a number of individual persistent storage devices including, but not limited to, magnetic memory devices, optical memory devices, solid state memory devices, phase change memory devices, any other suitable type of persistent memory device, or any combination thereof.

Those skilled in the art will appreciate that while FIG. 1 shows an FPGA, the invention may be implemented without an FPGA. Further, those skilled in the art will appreciate that other components may be used in place of the FPGA without departing from the invention. For example, the invention may be implemented using an ASIC(s), a graphics processing unit(s) (GPU), a general purpose processor(s), any other hardware device capable of calculating P and/or Q parity information for purposes of storing data in the storage array and/or performing various calculations necessary to recover corrupted data stored using the multi-dimensional RAID scheme, any devices that includes a combination of hardware, firmware, and/or software configured to calculate P and/or Q parity information for purposes of storing data in the storage array (108) and/or to perform various calculations necessary to recover corrupted data stored using the multi-dimensional RAID scheme, or any combination thereof.

FIG. 2 shows a RAID grid in accordance with one embodiment of the invention. In one embodiment of the invention, if the RAID controller implements a 2D RAID scheme or a 3D RAID scheme (see FIG. 3), the RAID controller stores data in a RAID Grid (200). FIG. 2 shows the conceptual portions of a RAID grid in accordance with one or more embodiments of the invention. The RAID grid (200) includes a number of RAID grid locations, where each RAID grid location is ultimately written to a unique physical address in the storage array. The RAID grid (200) includes (i) a data grid (202), which includes RAID grid locations that store data received from the client (i.e., data that the client has instructed the RAID controller to write to the storage array; (ii) a row P parity group (204), which includes the RAID grid locations that store in the P parity values calculated using data in RAID grid locations in a row (described below); (iii) a row Q parity group (206), which includes the RAID grid locations that store in the Q parity values calculated using data in RAID grid locations in a row (described below); (iv) a column P parity group (208), which includes the RAID grid locations that store in the P parity values calculated using data in RAID grid locations in a column (described below); (v) a column Q parity group (210), which includes the RAID grid locations that store in the Q parity values calculated using data in RAID grid locations in a column (described below); and (vi) an intersection parity group (212), which includes parity values calculated using (a) data from RAID grid locations in row P parity group (204), (b) data from RAID grid locations in row Q parity group (206), (c) data from RAID grid locations in column P parity group (208), and (d) data from RAID grid locations in column Q parity group (210) (described below).

Referring to row (214), in one embodiment of the invention, the data stored in RAID grid location denoted as $P_r$ in row (214) is calculated by applying a P parity function to all RAID grid locations in the row (214) that includes data (e.g., $P_r = f_P (D_1, D_2, D_3, D_4)$. Similarly, in one embodiment of the invention, the data stored in RAID grid location denoted as $Q_r$ in row (214) is calculated by applying a Q parity function to all RAID grid locations in the row (214) that includes data (e.g., $Q_r = f_Q (D_1, D_2, D_3, D_4)$.

Referring to column (216), in one embodiment of the invention, data stored in the RAID grid location denoted as $P_c$ in column (216) is calculated by applying a P parity function to all RAID grid locations in the column (216) that includes data (e.g., $P_C = f_P (D_5, D_2, D_6, D_7)$. Similarly, in one embodiment of the invention, data stored in the RAID grid location denotes by $Q_c$ in column (216) is calculated by applying a Q parity function to all RAID grid locations in the column (216) that includes data (e.g., $Q_C = f_Q (D_5, D_2, D_6, D_7)$.

Referring to the intersection parity group (212), in one embodiment of the invention, the data stored in the RAID grid location denoted as $I_{r1}$ may be calculated by applying a P parity function to all RAID grid locations in the row P Parity Group (204) or by applying a P parity function to all RAID grid locations in the column P Parity Group (208). For example, $I_{r1} = f_P (P_{r1}, P_{r2}, P_{r3}, P_{r4})$ or $I_{r1} = f_P (P_{c5}, P_{c6}, P_{c7}, P_{c8})$.

In one embodiment of the invention, the data stored in the RAID grid location denoted as $I_{r2}$ may be calculated by applying a P parity function to all RAID grid locations in the row Q Parity Group (204) or by applying a Q parity function to all RAID grid locations in the column P Parity Group (208). For example, $I_{r2} = f_P (Q_{r1}, Q_{r2}, Q_{r3}, Q_{r4})$ or $I_{r2} = f_Q (P_{c5}, P_{c6}, P_{c7}, P_{c8})$.

In one embodiment of the invention, the data stored in the RAID grid location denoted as $I_{r3}$ may be calculated by applying a P parity function to all RAID grid locations in the column Q Parity Group (210) or by applying a Q parity function to all RAID grid locations in the row P Parity Group (204). For example, $I_{r3} = f_P (Q_{c5}, Q_{c6}, Q_{c7}, Q_{c8})$ or $I_{r3} = f_Q (P_{c1}, P_{c2}, P_{c3}, P_{c4})$.

In one embodiment of the invention, the data stored in the RAID grid location denoted as $I_{r4}$ may be calculated by applying a Q parity function to all RAID grid locations in the column Q Parity Group (210) or by applying a Q parity function to all RAID grid locations in the row Q Parity Group (206). For example, $I_{r4} = f_Q (Q_{c1}, Q_{c2}, Q_{c3}, Q_{c4})$ or $I_{r4} = f_Q (Q_{c5}, Q_{c6}, Q_{c7}, Q_{c8})$.

In one embodiment of the invention, the P and Q parity functions used to calculate the values for all of parity groups may correspond to any P and Q parity functions used to implement RAID 6.

As discussed above, the RAID grid (200) shown in FIG. 2 represents the conceptual layout of a RAID grid. However, when the individual RAID grid locations are written to the storage array, the relative location of the various RAID grid locations may vary across a row and or a column. For example, referring to row (214), when the RAID grid locations within row (214) are written to the storage array, the relative location of RAID grid locations that include data (denoted by "D") and the RAID grid locations that include parity data (i.e., the RAID grid locations denoted as "$P_r$" and "$Q_r$") may be as follows: $<D_1, D_2\ P_{r2}, D_3\ Q_{r2}, D_4>$, $<P_{r2}, Q_{r2}, D_1, D_2, D_3\ D_4>$, or any other arrangement within row (214). Similarly, referring to column (216), the relative location of RAID grid locations that include data (denoted by "D") and the RAID grid locations that include parity data (i.e., the RAID grid locations denoted as "$P_c$" and "$Q_c$") may be as follows: $<D_5, D_2, D_6, P_{c6}, D_6, Q_{c6}>$, $<P_{c6}, D_5, D_2, Q_{c6}, D_6, D_7>$, or any other arrangement within column (216).

The RAID controller (or another entity in the system) may determine to which physical addresses in the storage array each of the RAID grid locations is written. This determination may be made prior to receiving any of the data (denoted as "D") for a particular RAID grid from the client. Alternatively, the determination may be made prior to writing the RAID grid locations to the storage array.

Those skilled in the art will appreciate that while FIG. 2 shows a RAID grid that is 6×6, the RAID grid may be implemented using any other dimensions without departing from the invention.

In one embodiment of the invention, the P parity value is a Reed-Solomon syndrome and, as such, the P Parity function may correspond to any function that can generate a Reed-Solomon syndrome. In one embodiment of the invention, the P parity function is an XOR function.

In one embodiment of the invention, the Q parity value is a Reed-Solomon syndrome and, as such, the Q Parity function may correspond to any function that can generate a Reed-Solomon syndrome. In one embodiment of the invention, a Q parity value is a Reed-Solomon code. In one embodiment of the invention, $Q = g^0 \cdot D_0 + g^1 \cdot D_1 + g^2 \cdot D_2 + \ldots + g^{n-1} \cdot D_{n-1}$, where Q corresponds any one of the Q parity values defined with respect to FIG. 2, g is a generator of the field, and the value of D corresponds to the data (which may include both values from the data grid and/or values from one or more rows or columns that include P or Q parity values).

Those skilled in the art will appreciate that while the RAID grid in FIG. 2 includes P and Q parity for each row and column, embodiments of the invention may be implemented using greater or fewer parity values without departing from the invention. For example, each row and column may only include a P parity value. In another example, each row and column may include three parity values. The aforementioned examples are not intended to limit the invention. In one embodiment of the invention, regardless of the number of parity values used in the implementation of the invention, each of the parity values is a Reed-Solomon syndrome.

FIG. 3 shows a RAID cube and various views of the RAID cube in accordance with one embodiment of the invention. As shown in FIG. 3, a RAID cube (300) corresponds to a conceptual stack of RAID grids (302). As discussed above, the RAID controller (or another entity in the system) selects the physical addresses within the storage array in which to store the data for each of the RAID grid locations. In one embodiment of the invention, the selection of the physical addresses may be determined in accordance with the IFDs for which the RAID grid (or RAID cube) is designed to protect against. Said another way, the physical addresses may be selected in a manner to protect against failures in one or more IFDs. For example, as shown in FIG. 3, each RAID grid location (not shown) for a given RAID grid (302, 304) is written to a physical address (or will be written to a physical address) in the storage array (not shown) that is selected using a unique pair of values from IFD 1 and IFD 2, but has the same value for IFD 3. For example, if the data in the storage array is stored in NAND flash, where the NAND flash is part of a storage module (which includes multiple NAND dies), then the IFDs may be as follows: (i) IFD 1=storage module, (ii) IFD 2=channel, and (iii) IFD 3=NAND die. Accordingly, in a given RAID grid, the data in each RAID grid location is written to a unique combination of storage module (IFD 1) and channel (IFD 2) but is written to the same NAND die (on each of the storage modules). Those skilled in the art will appreciate that the invention is not limited to the three independent fault domains described above. Further, those skilled in the art will appreciate that the invention is not limited to a storage array that includes NAND flash.

Continuing with FIG. 3, as discussed above, the RAID cube (300) is conceptual stack of RAID grids. More specifically, in one embodiment of the invention, the RAID cube (300) may include (i) a data portion (316), which includes two or more RAID grids (304, 306, 308, 310) (see FIG. 2) and a parity portion (318) that includes a P parity RAID grid (312) and a Q parity RAID grid (314).

In one embodiment of the invention, the RAID grids (304, 306, 308, 310) in the data portion (316) include parity data (see FIG. 2), which allows data within the RAID grid to be recovered using only data (including parity data) within the RAID grid. In one embodiment of the invention, the RAID cube is arranged such that data for a given RAID grid location in a given RAID grid (304, 306, 308, 310) may be recovered using data (including parity data) from other RAID grids (in both the data portion (316) and the parity portion (318). In one embodiment of the invention, the parity portion (318) of the RAID cube enables such a recovery mechanism.

In one embodiment of the invention, the P parity RAID grid (312) is the same dimension as the underlying RAID grids (304, 306, 308, 310), where the data in every RAID grid location within the P Parity RAID grid is calculated by applying a P parity function (e.g., an XOR function) to data (including parity data) from the RAID grids in the data portion (316) (see FIG. 7) Similarly, the Q parity RAID grid (314) is the same dimension as the underlying RAID grids (304, 306, 308, 310), where the data in every RAID grid location within the Q Parity RAID grid is calculated by applying a Q parity function to data (including parity data) from the RAID grids in the data portion (316) (see FIG. 7).

FIG. 4 shows data structures in accordance with one embodiment of the invention. In one embodiment of the invention, the RAID controller includes one or more data structures to implement the multi-dimensional RAID schemes.

In one embodiment of the invention, the RAID controller includes a data structure that tracks the mappings between data provided by the client and the physical address of such data in the storage array. In one embodiment of the invention, the RAID controller tracks the aforementioned information using a mapping between a logical address e.g., <object, offset> (400), which identifies the data from the perspective of the client, and physical address (402), which identifies the location of the data within the storage array. In one embodiment of the invention, the mapping may be between a hash value derived from applying a hash function (e.g., MD5, SHA 1) to <object, offset>. Those skilled in the art will appreciate that any form of logical address may be used without departing the invention.

In one embodiment of the invention, the RAID controller includes a data structure that tracks how each RAID grid location (404) (see FIG. 2) is mapped to a particular physical address (402) in the storage array.

In one embodiment of the invention, the RAID controller includes a data structure that tracks which RAID grid (including RAID grids in the data portion and the parity portion) (408) is associated with which RAID cube (406) (assuming that the RAID controller is implementing a 3D RAID scheme) and also which RAID grid locations (404) are associated with each RAID grid (408).

In one embodiment of the invention, the RAID controller includes a data structure that tracks the state (410) of each RAID grid location (404). In one embodiment of the invention, the state (410) of a RAID grid location may be set as filled (denoting that data (or parity data) has been written to the RAID grid location) or empty (denoting that no data (or parity data) has been written to the RAID grid location). In one embodiment of the invention, the RAID controller may also set the state of the RAID grid location to filled if the RAID controller has identified data in the RAID controller to write to the RAID grid location (see FIG. 5, Step 506).

In one embodiment of the invention, the RAID controller includes a data structure that tracks the RAID grid geometry. In one embodiment of the invention, the RAID grid geometry may include, but is not limited to, the size of RAID grid and the IFD associated with each dimension of the RAID grid. This data structure (or another data structure) may also track the size of the RAID cube and the IFD associated with each dimension of the RAID cube.

In one embodiment of the invention, the RAID controller includes a data structure that tracks the location of each P and Q parity value (including parity values within the intersection parity group (see FIG. 2)) within each row and/or column within each RAID grid.

In one embodiment of the invention, the RAID controller includes a data structure that tracks which RAID grid locations in the data portion of the RAID cube are used to calculate each of the P and Q parity values in the P Parity RAID grid and Q parity RAID grid, respectively.

Figure 5A:
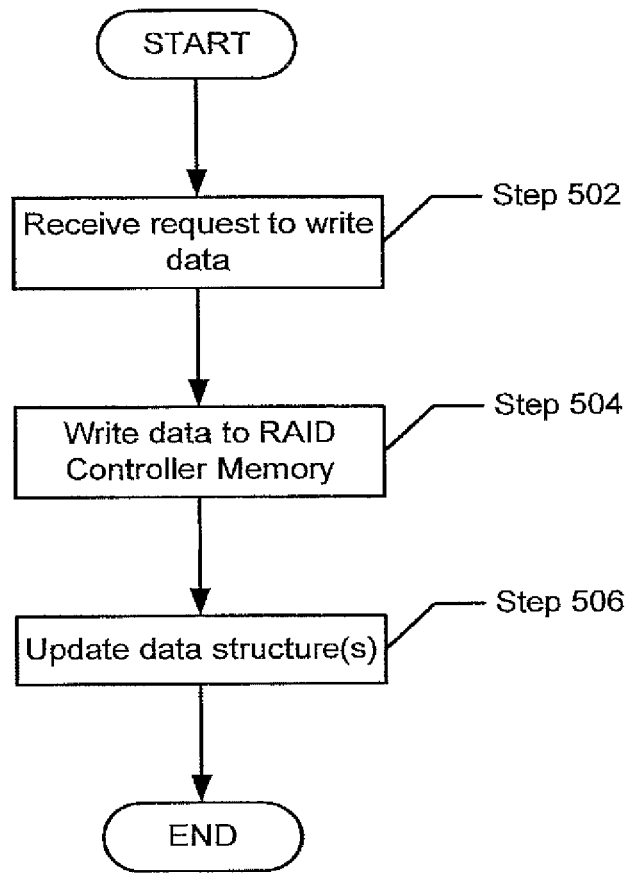
FIGS. 5A-5C show flow charts in accordance with one embodiment of the invention.
Figure 5B:
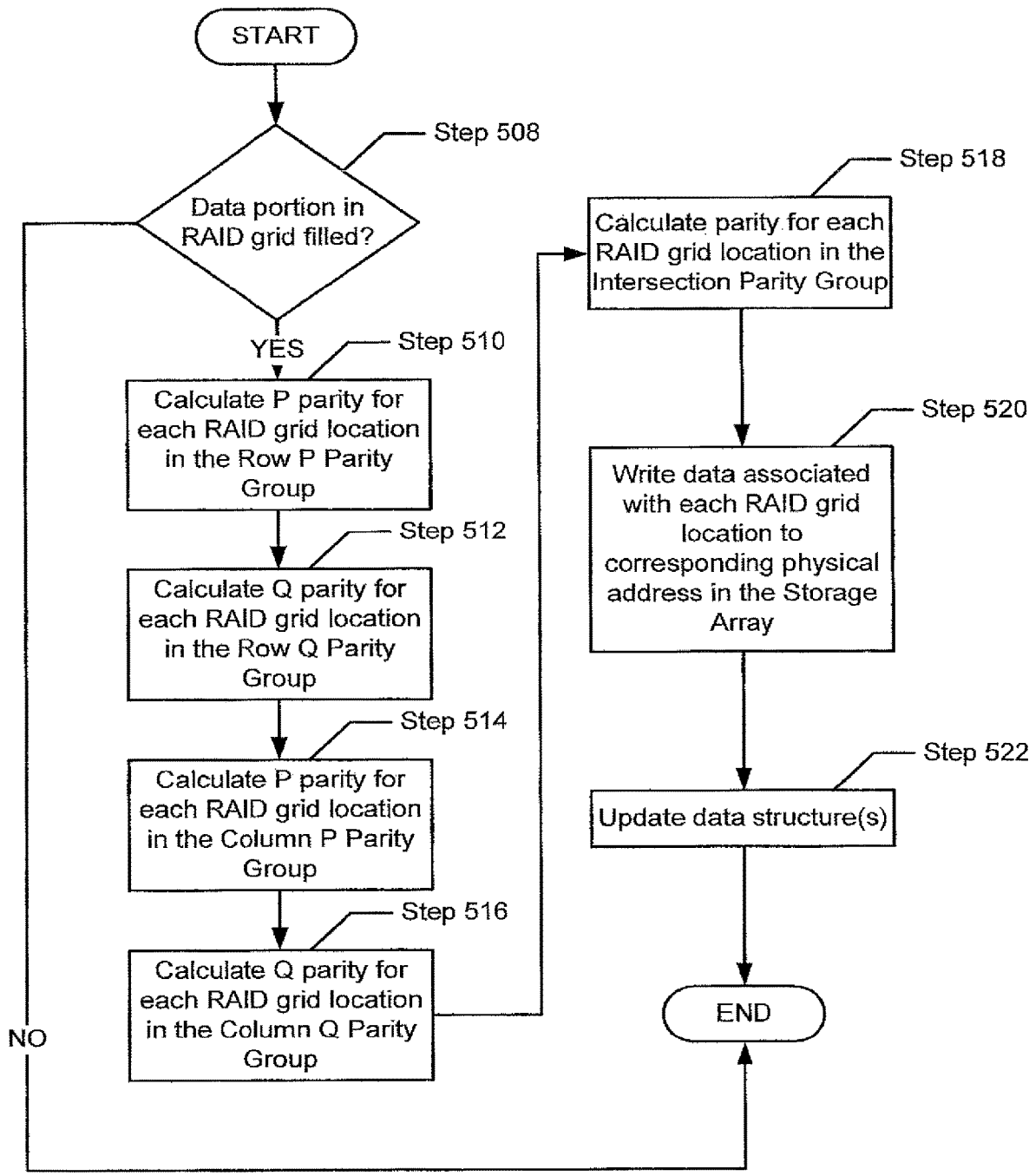
Figure 5C:
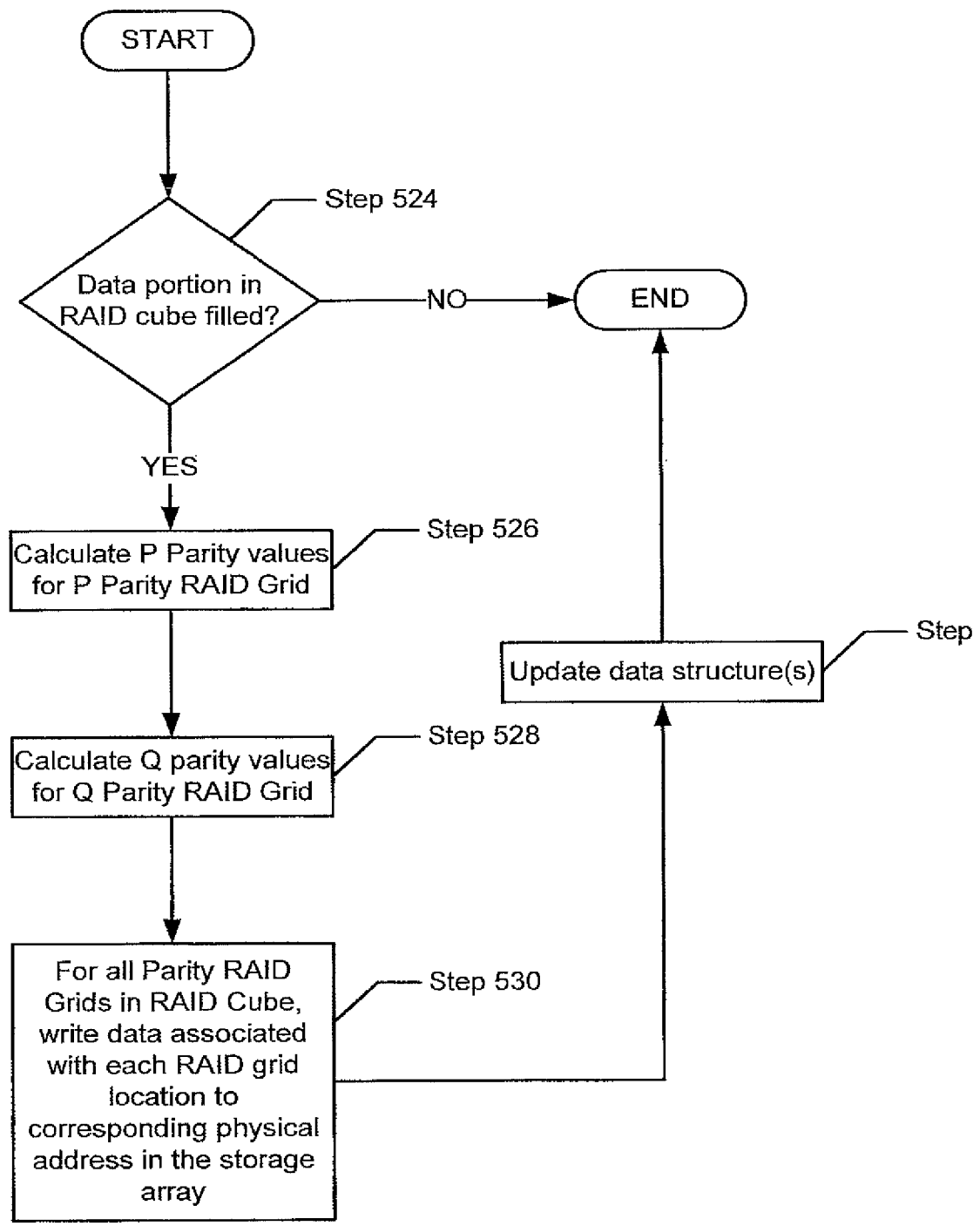

FIGS. 5A-5C show flowcharts in accordance with one or more embodiments of the invention. More specifically, FIGS. 5A-5C show a method for storing data in a storage array in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the methods shown in FIGS. 5A, 5B, and 5C may be performed in parallel.

Referring to FIG. 5A, in step 502, a request to write data is received from the client. In one embodiment of the invention, the request includes the <object, offset> that identifies the data from the perspective of the client. In step 504, the RAID controller, in response to the request, writes the data to a location in the RAID controller memory.

In step 506, the RAID controller updates one or more of the data structures (see FIG. 4). More specifically, in one embodiment of the invention, the RAID controller may (i) select a physical address in the storage array in which to write the data received from the client and (ii) create a mapping between the <object, offset> for the data and the selected physical address. In one embodiment of the invention, at some point prior to selecting the physical address in which to write the data, the RAID controller specifies (i) at least one RAID grid, (ii) RAID grid locations for the RAID grid, and (iii) the physical address in the storage array associated with each RAID grid location. In addition, the RAID controller may initialize the state of each RAID grid location to empty.

In one embodiment of the invention, FIG. 5B shows a method for writing a RAID grid to the storage array in accordance with one or more embodiments of the invention. Referring to FIG. 5B, in step 508, a determination is made about whether a data grid within a given RAID grid (e.g., 202 in FIG. 2) is filled. In one embodiment of the invention, this determination is made using one or more of the data structures described with respect to FIG. 4. If the data grid within a given RAID grid is filled, the process proceeds to step 510; otherwise, the process ends.

In step 510, the P parity is calculated for each RAID grid location in the Row P parity group (e.g., 204 in FIG. 2) using the appropriate values from RAID grid locations in the data grid. In step 512, the Q parity is calculated for each RAID grid location in the Row Q parity group (e.g., 206 in FIG. 2) using the appropriate values from RAID grid locations in the data grid. In step 514, the P parity is calculated for each RAID grid location in the Column P parity group (e.g., 208 in FIG. 2) using the appropriate values from RAID grid locations in the data grid. In step 516, the Q parity is calculated for each RAID grid location in the Column Q parity group (e.g., 210 in FIG. 2) using the appropriate values from RAID grid locations in the data grid.

In step 518, the parity values for all RAID grid locations in the intersection parity group (e.g., 212 in FIG. 2) are calculated using the appropriate values from RAID grid locations in one or more of the Row P parity group (e.g., 204 in FIG. 2), Row Q parity group (e.g., 206 in FIG. 2), Row Q parity group (e.g., 206 in FIG. 2), and Column Q parity group (e.g., 210 in FIG. 2).

In step 520, the data associated with each RAID grid location for the RAID grid is written to the appropriate physical address in the storage array. In one embodiment of the invention, the physical address in which to write data for each of the RAID grid locations is obtained from the one or more of the data structures described with respect to FIG. 4. In step 522, one or more data structures described with respect to FIG. 4 are updated to reflect that the RAID grid has been written to the storage array.

In one embodiment of the invention, if the RAID controller is implementing a 3D RAID scheme, then the RAID controller may perform the method shown in FIG. 5C. Referring to FIG. 5C, in step 524, a determination is made about whether a data portion of the RAID cube is filled. If the data portion of the RAID cube is filled, the process proceeds to Step 526; otherwise the process ends. In one embodiment of the invention, this determination is made using one or more of the data structures described with respect to FIG. 4.

In step 526, the P parity values for each RAID grid location in the P parity RAID grid (e.g., 312 in FIG. 3) is calculated. In one embodiment of the invention, the values for each of the RAID grid locations is calculated using one value obtained from each of the RAID grids in the data portion (e.g., 316 in FIG. 3) of the RAID cube.

In step 528, the Q parity values for each RAID grid location in the Q parity RAID grid (e.g., 314 in FIG. 3) is calculated. In one embodiment of the invention, the values for each of the RAID grid locations is calculated using one value obtained from each of the RAID grids in the data portion (e.g., 316 in FIG. 3) of the RAID cube.

In step 530, the data associated with each RAID grid location in the Parity RAID grids (e.g., P Parity RAID Grid and Q Parity RAID Grid) is written to the appropriate physical address in the storage array. In one embodiment of the invention, the physical address in which to write data for each of the RAID grid locations is obtained from the one or more of the data structures described with respect to FIG. 4. In step 532, one or more data structures described with respect to FIG. 4 are updated to reflect that the RAID cube has been written to the storage array.

Figure 6A:
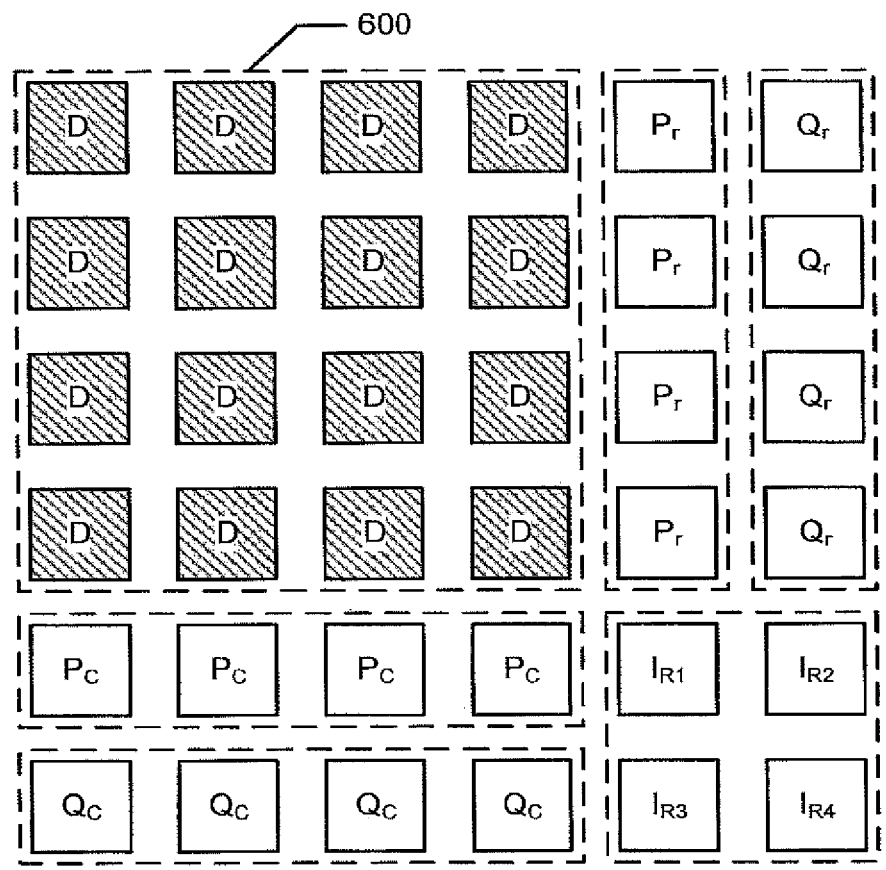
FIGS. 6A-6C show an example in accordance with one or more embodiments of the invention.
Figure 6B:
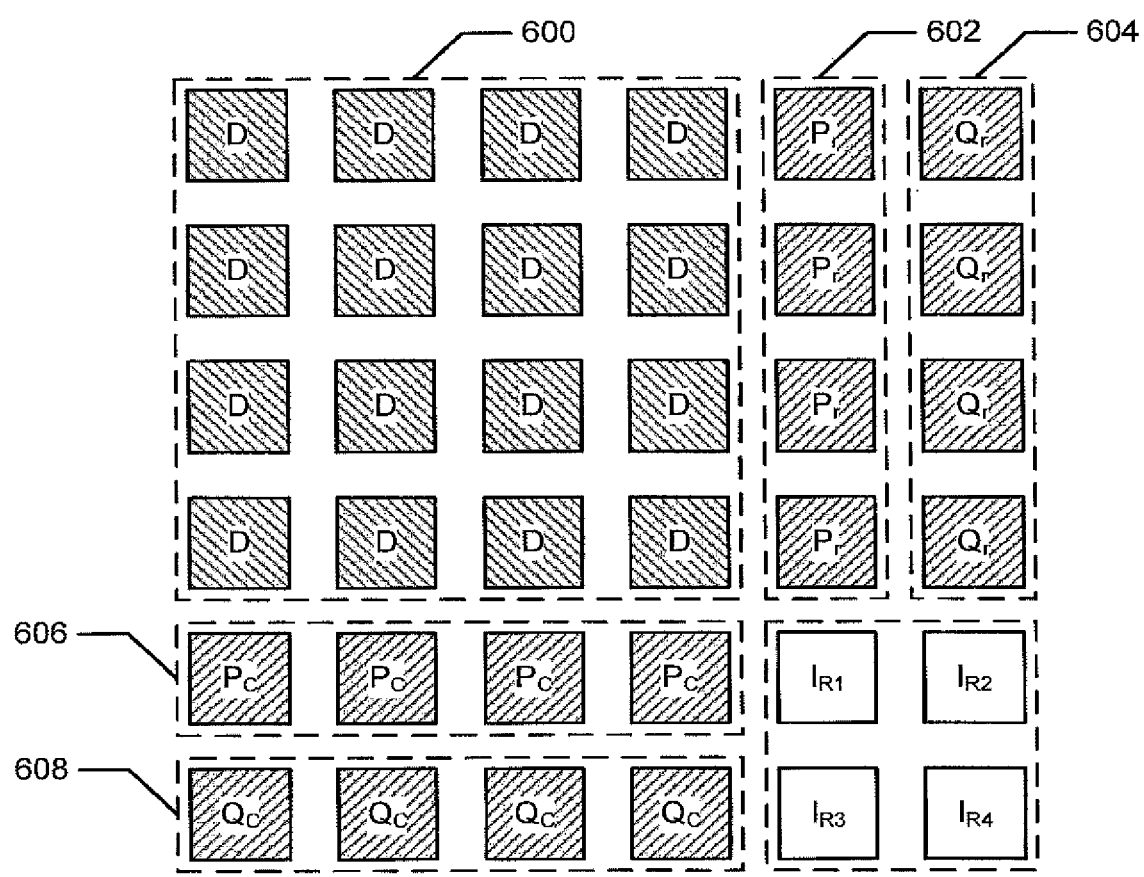
Figure 6C:
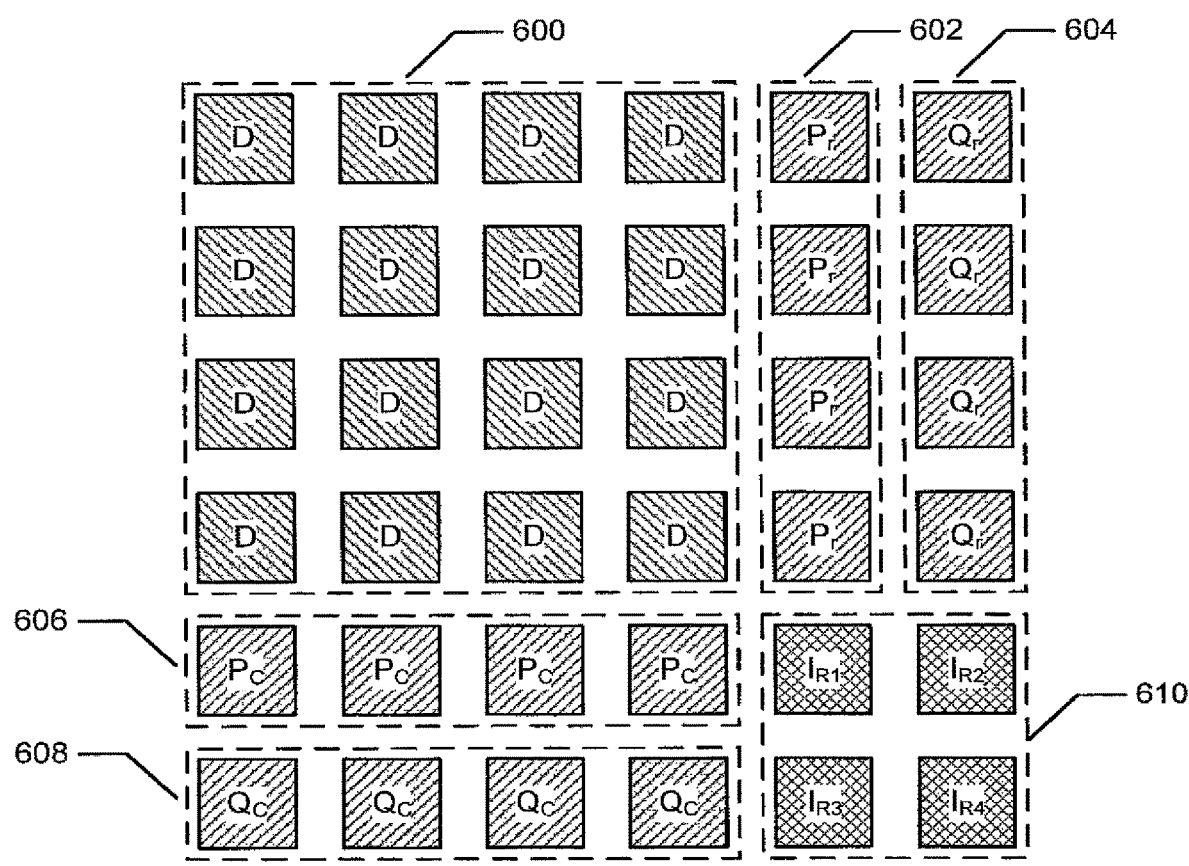

FIGS. 6A-6C show an example of populating a RAID grid in accordance with one or more embodiments of the invention. The example is not intended to limit the scope of the invention.

Referring to FIG. 6A, the data from the client (denoted as "D") is written to the data grid (600) within the RAID grid. Once the data grid (600) is filled (as shown in FIG. 6A), the RAID controller (not shown) calculates the values for the RAID grid locations in the following groups: the Row P parity group (602), Row Q parity group (604), Row Q parity group (606), and Column Q parity group (608). FIG. 6B shows the RAID grid after all of the values for the aforementioned RAID grid locations are calculated. At this stage, the only remaining values to calculate are the values for the RAID grid locations in the Intersection RAID group (610). FIG. 6C shows the RAID grid after all of the values in the Intersection RAID group (610) are calculated.

In one embodiment of the invention, all values for all RAID grid locations for a given RAID grid are stored in the RAID controller memory prior to the RAID controller writing the RAID grid to the storage array.

FIGS. 7A-7D show an example of populating a RAID cube in accordance with one or more embodiments of the invention. The example is not intended to limit the scope of the invention.

Figure 7A:
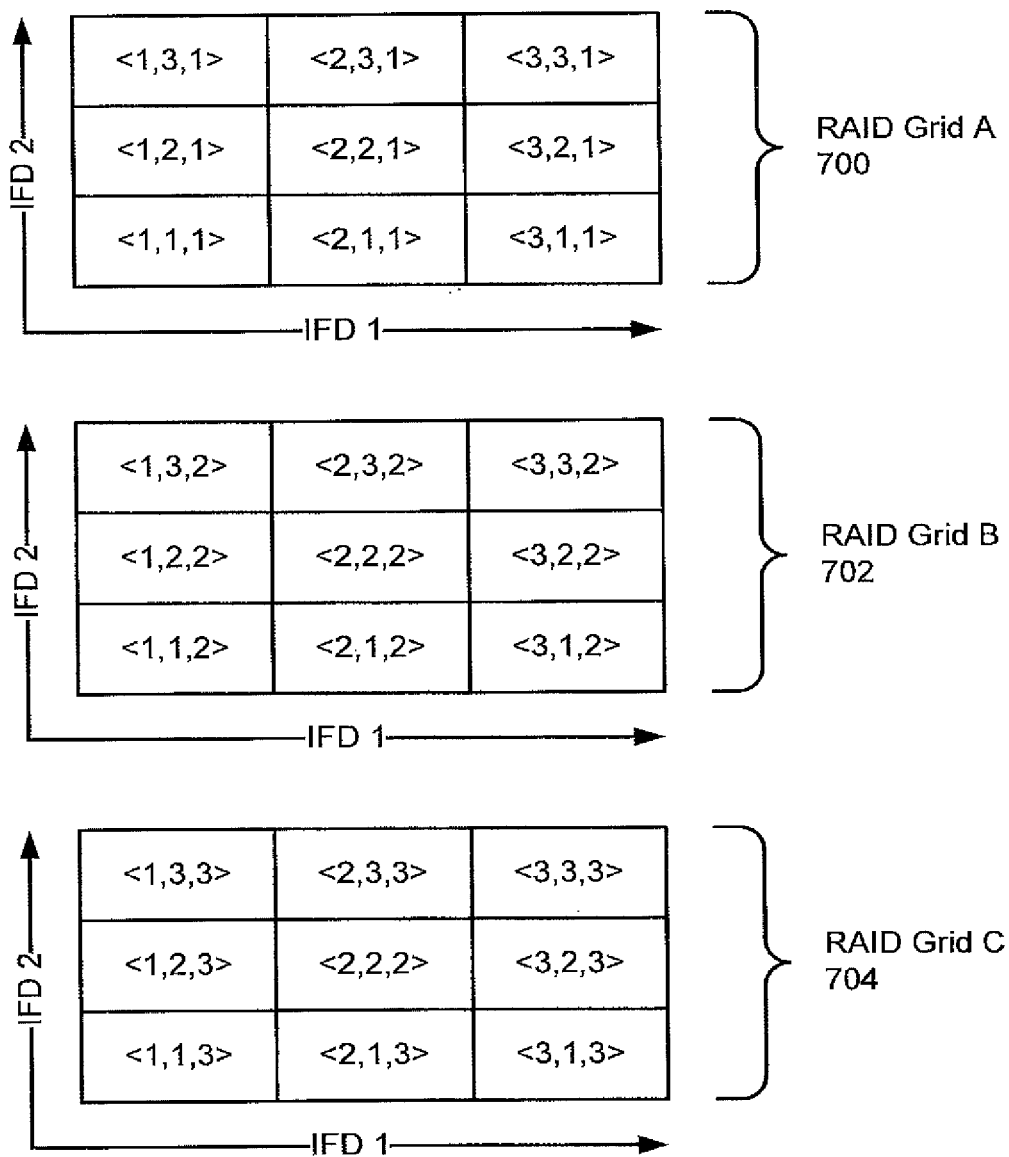
FIGS. 7A-7D show an example in accordance with one or more embodiments of the invention.
Figure 7B:
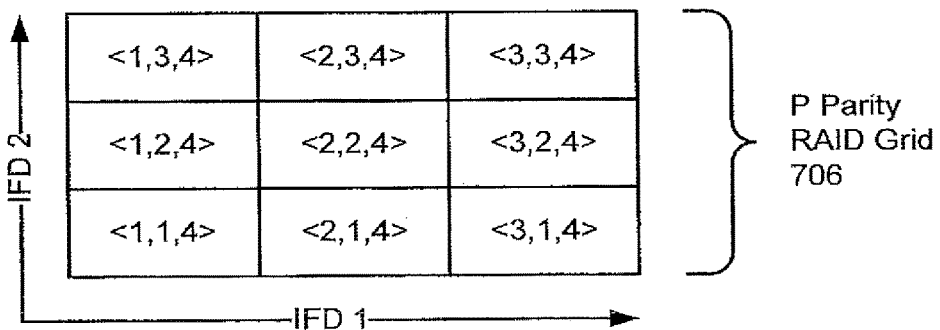
Figure 7C:
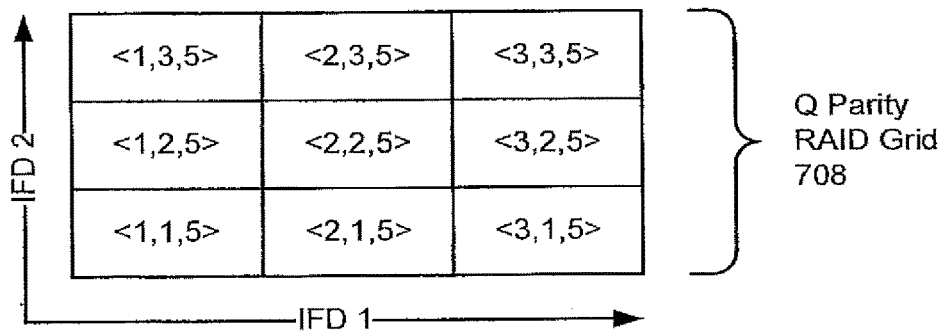
Figure 7D:
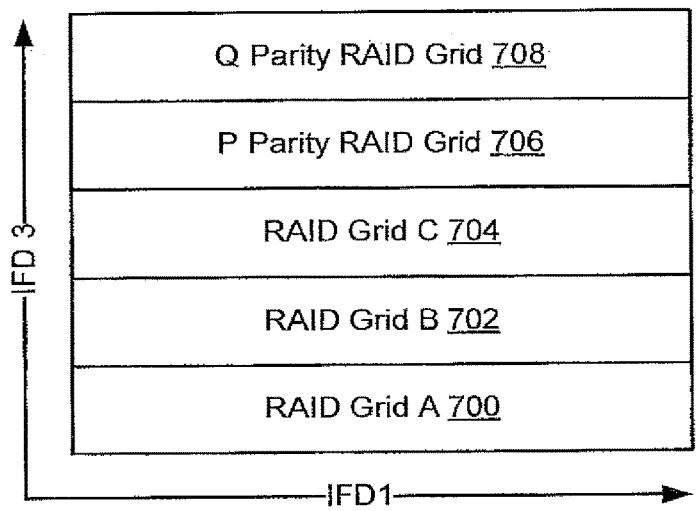

Consider the RAID cube depicted in FIG. 7D, which includes RAID grid A (700) RAID grid B (702), RAID grid C (704), P parity RAID grid (706), and Q parity RAID grid (708). Further, each RAID grid (700, 702, 704, 706, 708) in the RAID cube includes RAID grid locations that are written across IFD 1 and IFD 2 but have a constant value of IFD 3. Accordingly, in one embodiment of the invention, the value of a RAID grid location (the "target RAID grid location") in a RAID grid may be recovered using (i) only values of RAID grid locations in the row or column in which the target RAID grid location is located; (ii) using values of any RAID grid location within the RAID grid in which the target RAID grid, location is located; or (iii) using values of any RAID grid location within the RAID cube in which the target RAID grid location is located. Said another way, in one embodiment of the invention, the arrangement of the data and parity values within the RAID grid and/or RAID cube allows the value in a target RAID grid location to be recovered when there are more than two errors in each of the row and column in which the target RAID grid location is located.

Referring to FIG. 7A, FIG. 7A includes three RAID grids (700, 702, 704), which make up the data portion of the RAID cube. Each of the RAID grid location in each of the RAID grids (700, 702, 704) includes a 3-tuple defining the location in the storage array in which the data in the RAID grid location is written. In this example, the elements in the 3-tuple correspond to IFDs as follow: <IFD1, IFD2, IFD3>. The 3-tuples illustrates how the locations in the storage array are selected across the various IFDs. In particular, each of the RAID grid location in RAID grid A includes a unique combination of IFD1 and IFD2, but the same value for IFD3. For example, if IFD1 is a storage module, IFD2 is a channel, and IFD3 is a NAND die, then 3-tuple <4, 2, 1> indicates that the data in the particular RAID grid location will be written to a physical address in NAND die 1 in Storage Module 4 using Channel 2. Similarly, the 3-tuple <2, 3, 1> indicates that the data in the particular RAID grid location will be written to a physical address in NAND 1 in Storage Module 2 using Channel 3.

RAID grid B (702) and RAID grid C (704) are arranged in a similar manner to RAID grid A (700). However, the value for IFD3 in the 3-tuples for RAID grid locations in RAID grid B (702) is different than the value of IFD3 in the 3-tuples for RAID grid locations for RAID grid A (700). Further, the value for IFD3 in the 3-tuples for RAID grid locations for RAID grid C (704) is different than the value of IFD3 in the 3-tuples for RAID grid locations for RAID grid A (700) and for RAID grid B (702).

Referring to FIG. 7B, data in each of the RAID grid locations in P Parity RAID grid (706) are arranged in a similar manner to RAID grid A (700), RAID grid B (702), and RAID grid C (704). Further, as described above, the value of the data in each of the RAID grid locations in P Parity RAID grid (706) is calculated using data from one RAID grid location in each of the data grids in the RAID cube (i.e., RAID grid A (700), RAID grid B (702), RAID grid C (704)). For example, the value of the data at RAID grid location <1, 1, 4> in the P Parity RAID grid (706) is determined by applying a P parity function (e.g., an XOR function) to data from the following RAID grid locations: (i) data from RAID grid A (700) <1,1,1>, (ii) data from RAID grid B (702) <1,1,2>, and (iii) data from RAID grid C (704) <1,1,3>. The values for data in the other RAID grid locations in P Parity RAID grid (706) are calculated in a similar manner.

Referring to FIG. 7C, data in each of the RAID grid locations in Q Parity RAID grid (708) are arranged in a similar manner to RAID grid A (700), RAID grid B (702), and RAID grid C (704). Further, as described above, the value of the data in each of the RAID grid locations in Q Parity RAID grid (708) is calculated using data from one RAID grid location in each of the data grids in the RAID cube (i.e., RAID grid A (700), RAID grid B (702), RAID grid C (704)). For example, the value of the data at RAID grid location <1, 1, 5> in the Q Parity RAID grid (708) is determined by applying a Q parity function (as described above) to data from the following RAID grid locations: (i) data from RAID grid A (700) <1,1,1>, (ii) data from RAID grid B (702) <1,1,2>, and (iii) data from RAID grid C (704) <1,1,3>. The values for data in the other RAID grid locations in Q Parity RAID grid (708) are calculated in a similar manner.

Figure 8:
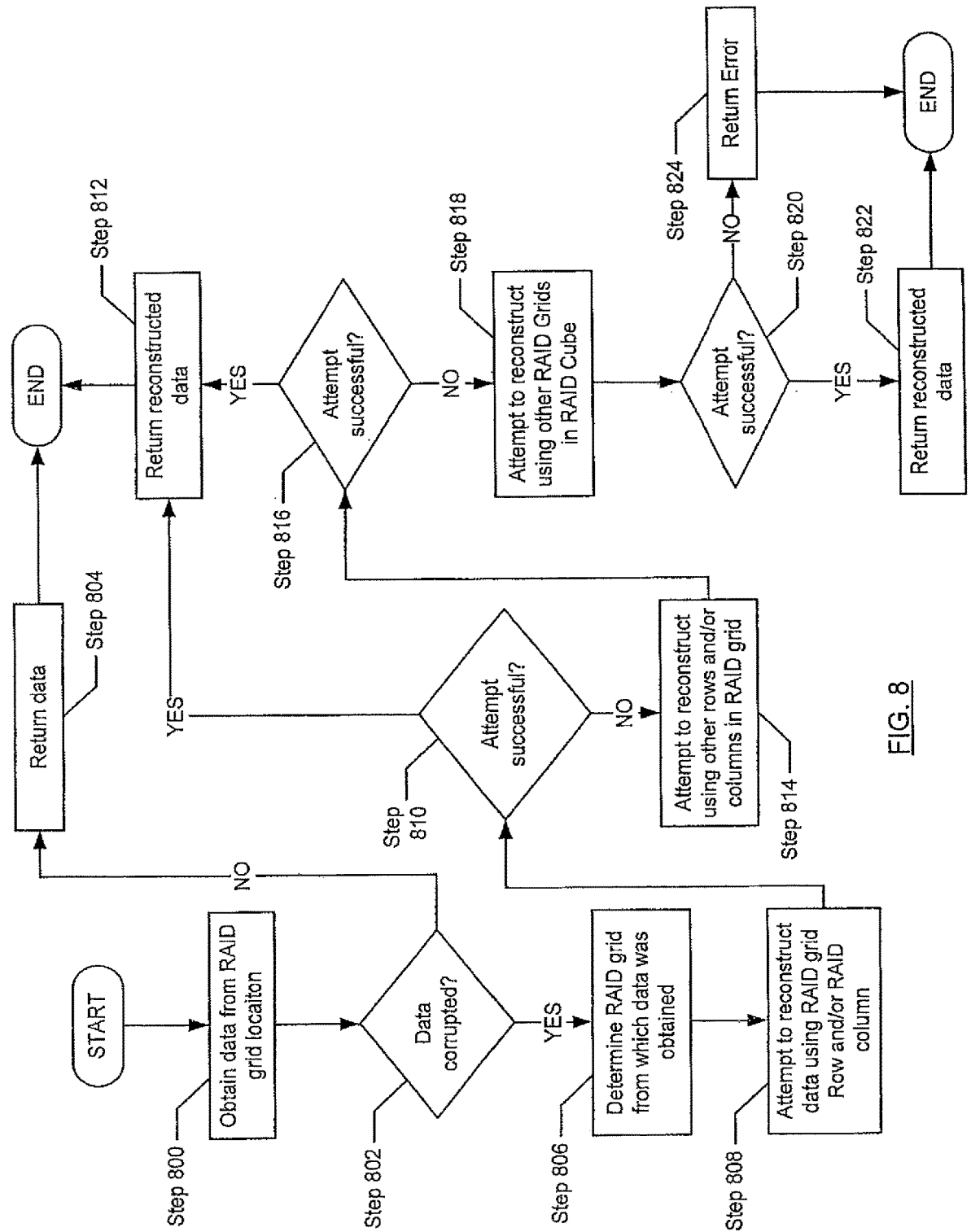
FIG. 8. shows a flow chart in accordance with one or more embodiments of the invention.

FIG. 8. shows a flow chart in accordance with one or more embodiments of the invention. More specifically, FIG. 8 shows a method for obtain data from the storage array in accordance with one or more embodiments of the invention.

In step 800, data is obtained from a RAID grid location. In one embodiment of the invention, the data is obtained in response to a request from a client. In one embodiment of the invention, the request may specify an <object, offset> and the RAID controller may use one or more of the data structures described with respect to FIG. 4 to determine the physical address in the storage array at which the requested data is stored. The RAID controller may subsequently obtain the requested data from the storage array.

In step 802, a determination is made about whether the data obtained in step 800 is corrupted. In one embodiment of the invention, the RAID controller may implement any known method (e.g., checksums) for determining whether the data is corrupted. If the data is not corrupted the process proceeds to step 804; otherwise the process proceeds to step 806. In step 804, the data is returned to the client and the process ends. In another in embodiment of the invention, if the data is unable to be obtained—for example, because the persistent storage is damaged or unplugged, or the read command fails, then process may proceed to Step 806.

In step 806, the RAID controller determines from which RAID grid the data was obtained. In step 808, the RAID controller attempts to reconstruct the data using the other RAID grid locations within the row and/or column in which the RAID grid location that included the data is located.

In step 810, a determination is made about whether the reconstruction attempt in step 808 was successful. In one embodiment of the invention, the RAID controller may implement any known method (e.g., checksums) for determining whether the reconstruction attempt was successful. If the reconstruction attempt in step 808 was successful, the process proceeds to step 812; otherwise the process proceeds to step 814. In step 812, the reconstructed data is returned to the client and the process ends.

In step 814, the RAID controller attempts to reconstruct the data using the other RAID grid locations in other rows and/or columns the RAID grid. In step 816, a determination is made about whether the reconstruction attempt in step 814 was successful. In one embodiment of the invention, the RAID controller may implement any known method (e.g., checksums) for determining whether the reconstruction attempt was successful. If the reconstruction attempt in step 814 was successful, the process proceeds to step 812; otherwise the process proceeds to step 818.

In step 818, the RAID controller attempts to reconstruct the data using the other RAID grids in the RAID cube. In step 820, a determination is made about whether the reconstruction attempt in step 818 was successful. In one embodiment of the invention, the RAID controller may implement any known method (e.g., checksums) for determining whether the reconstruction attempt was successful. If the reconstruction attempt in step 818 was successful, the process proceeds to step 822; otherwise the process proceeds to step 824. In step 822, the reconstructed data is returned to the client and the process ends. In step 824, the RAID controller returns an error to the client, which indicates that the requested data cannot be retrieved from the storage array by the RAID controller.

Those skilled in the art will appreciate that reconstructing the data using the other RAID grids in the RAID cube only occurs in the event that the RAID controller is implementing a 3D RAID scheme.

Figure 9A:
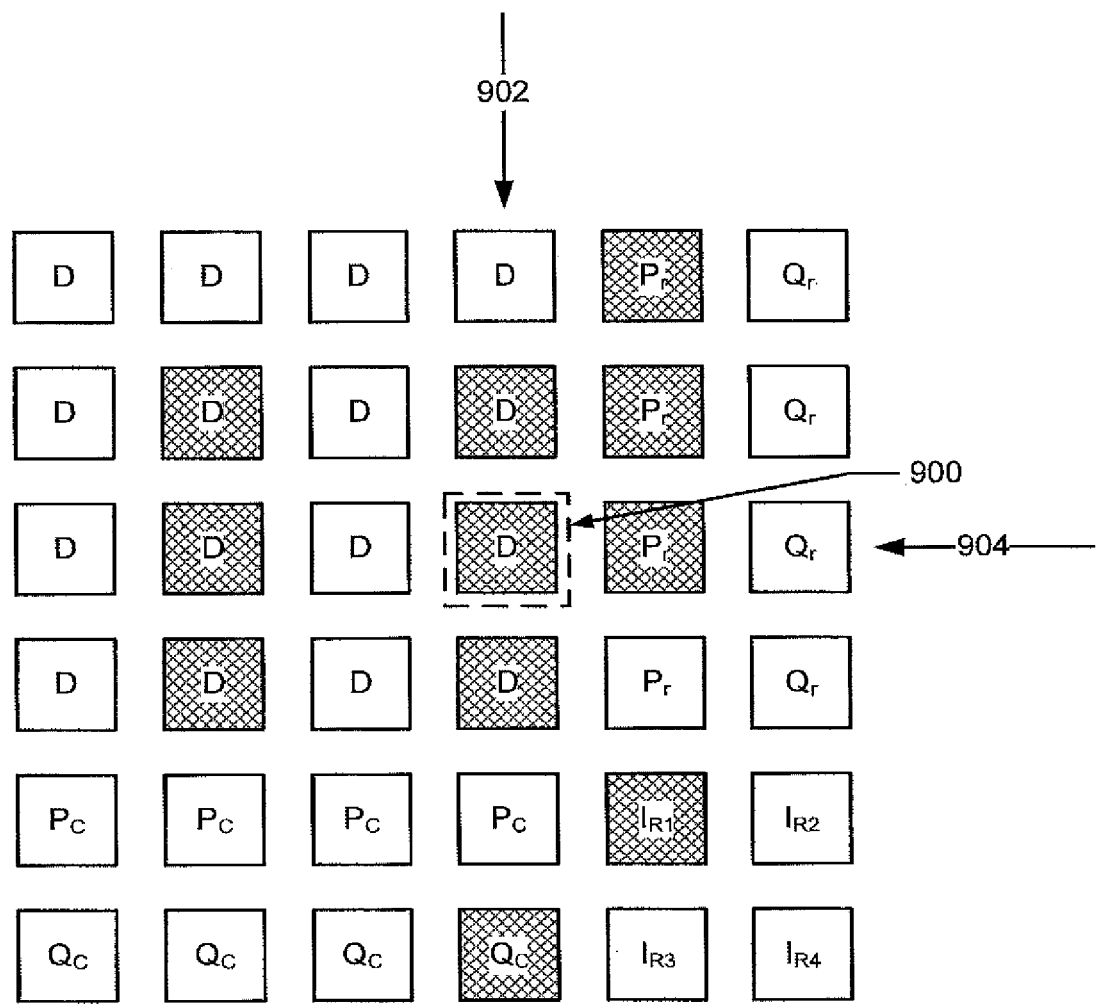
FIGS. 9A-9D show an example in accordance with one or more embodiments of the invention.

FIGS. 9A-9D show an example in accordance with one or more embodiments of the invention. The example is not intended to limit the scope of the invention. Referring to FIG. 9A, consider a scenario in which a client requested data from RAID grid location (900). However, the data from RAID grid location (900) is corrupted (as denoted by the shading). The RAID controller first attempts (per step 808 in FIG. 8) to reconstruct the data in RAID grid location (900) using data from RAID grid location in row (904) and/or column (902). However, because row (904) and column (902) each include three RAID grid locations that include corrupted data, the data in RAID grid location (900) cannot be recovered using only data from row (904) and/or column (902).

Figure 9B:
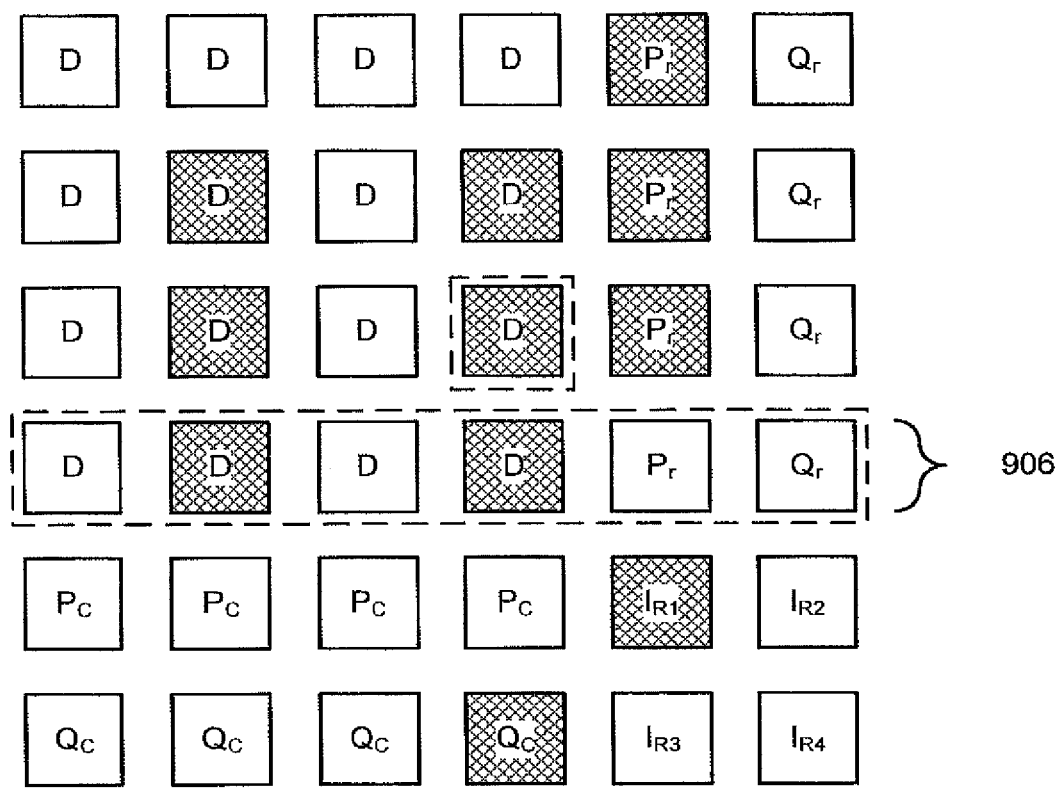
Figure 9C:
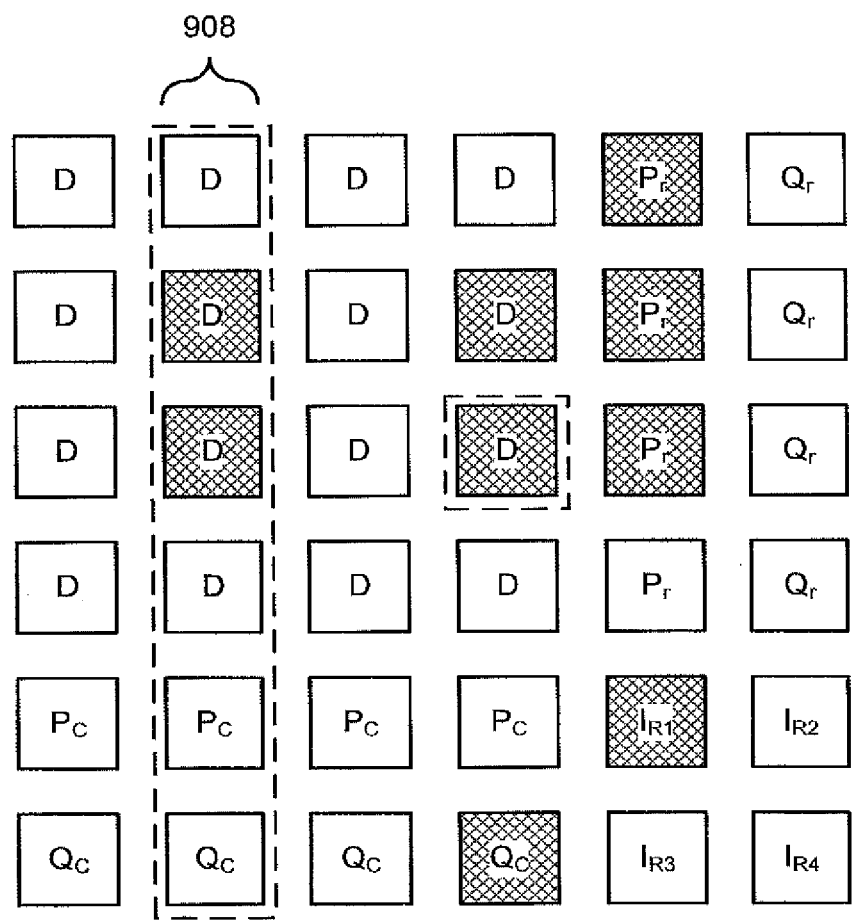
Figure 9D:
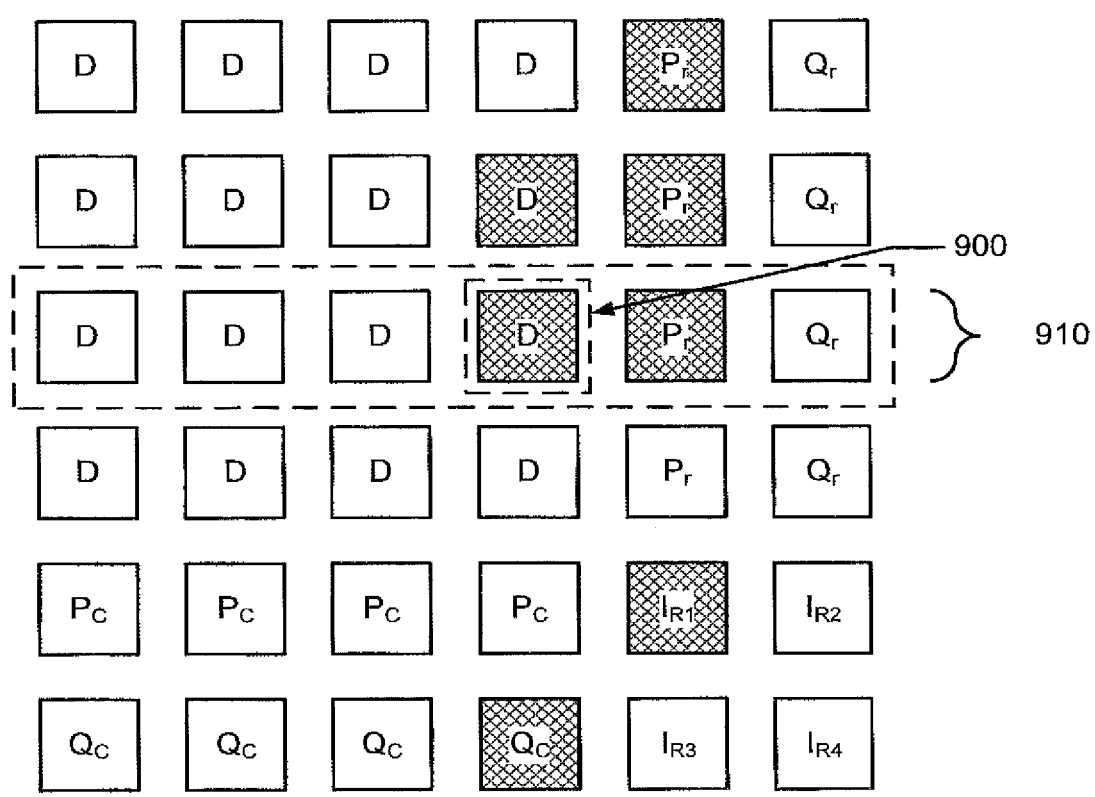

Referring to FIG. 9B, the RAID controller attempts (per step 814 in FIG. 8) to reconstruct the data in RAID grid location (900) using data from other RAID grid locations in the RAID grid. In this example, the RAID controller reconstructs all corrupted data in row (906). Referring to FIG. 9C, based on the reconstruction of the corrupted data in row (906), the RAID controller is able to reconstruct all corrupted data in column (908). Finally, referring to FIG. 9D, based on the reconstruction of the corrupted data in column (908), the RAID controller is able to reconstruct the data in RAID grid location (900) using the other non-corrupted data in row (910). In one embodiment of the invention, the reconstruction of the various corrupted data as shown in FIGS. 9B-9D are performed as part of step 814 in FIG. 8.

Though not shown in FIGS. 9A-9D, if the data in RAID grid location (900) could not be constructed using only the data in the RAID grid, the RAID controller would attempt to reconstruct the data in RAID grid location (900) (per Step 818 in FIG. 8) using data in other RAID grids within a RAID cube (not shown) if the RAID controller was implementing a 3D RAID scheme.

Those skilled in the art will appreciate that while various examples of the invention has been described with respect to storing data in a storage array along IFDs and/or storing data in NAND flash, embodiments of the invention may be implemented on any multi-dimensional disk array without departing from the invention. For example, one or more embodiments of the invention may be implemented using a two dimensional array of disks (magnetic, optical, solid state, or any other type of storage device), where data for each RAID grid location in a RAID grid is stored on a separate disk.

Further, in one embodiment of the invention, in the event that the RAID controller is implementing a 3D RAID scheme using a two dimensional array of disks, the RAID controller may store data for each of the RAID grid locations using the following n-tuple: <disk x, disk y, logical block address (LBA) z>, where x and y are the dimensions of the disk array. Further, for a given RAID grid the LBA is constant for each RAID grid location for a single RAID grid; however, the LBA is different across the RAID grids in the RAID cube.

The above examples for implementing embodiments of the invention using a two-dimensional disk array are not intended to limit the scope of the invention.

Those skilled in the art will appreciate that while the invention has been described with respect to a 2D RAID scheme and a 3D RAID scheme, embodiments of the invention, may be extended to any multi-dimensional RAID scheme.

One or more embodiments of the invention may be implemented using instructions executed by one or more processors in the system. Further, such instructions may corresponds to computer readable instructions that are stored on one or more non-transitory computer readable mediums.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing data in a storage array comprising persistent storage, the method comprising:
    receiving, by a controller, the data to write to the storage array;
    in response to the receiving, temporarily storing the data in a grid in a memory operatively connected to the controller until parity values associated with the data are calculated;
    calculating the parity values for the grid using the data,
        wherein the grid comprises a data grid and a parity portion;
        wherein the grid comprises a plurality of grid locations,
        wherein a first portion of the grid locations is associated with the data grid;
        wherein a second portion of the grid locations is associated with the parity portion;
        wherein each of the plurality of grid locations is associated with a physical location in the storage array, wherein each physical location in the storage array is associated with a tuple specifying at least two independent fault domains in the storage array;
        wherein the parity portion comprises a Row Q Parity Group, a Row P Parity Group, a Column Q Parity Group, a Column P Parity Group, and an Intersection Parity Group,
        wherein each of the parity values is associated with one selected from a group consisting of the Row Q Parity Group, the Row P Parity Group, the Column Q Parity Group, the Column P Parity Group, and the Intersection Parity Group, and
        wherein the parity values associated with the Intersection Parity Group are calculated using the parity values from at least one selected from a group consisting of the Row Q Parity Group, the Row P Parity Group, the Column Q Parity Group, and the Column P Parity Group;
    after the parity values are calculated:
        writing, using the controller, the data that is stored in the memory to the first portion of the grid locations,
            wherein each of the grid locations associated with the first portion of the grid locations comprises a portion of the data,
            wherein writing the data to the first portion of the grid locations comprises using the tuples associated with the first portion of the grid locations; and
        writing, using the controller, the parity values for the grid to the second portion of the grid locations,
            wherein the grid locations in the second portion of the grid are associated with physical locations in the storage array associated with the Row Q Parity Group, the Row P Parity Group, the Column Q Parity Group, the Column P Parity Group, and the Intersection Parity Group,
            wherein writing the parity values to the second portion of the grid locations comprises using the tuples associated with the second portion of the grid locations.

2. The method of claim 1, wherein the storage array comprises a plurality of storage modules, wherein each of the plurality of storage modules comprises solid state memory, and wherein a first independent fault domain of the at least two independent fault domains is the plurality of storage modules and a second independent fault domain of the at least two independent fault domains is a plurality of channels in each of the plurality of storage modules.

3. The method of claim 2, wherein a third independent fault domain of the at least two independent fault domains is a plurality NAND dies in the plurality of storage modules.

4. The method of claim 1, wherein the storage array comprises solid state memory.

5. The method of claim 4, wherein the solid state memory comprises NAND flash.

6. The method of claim 1, wherein the parity values associated with the Intersection Parity Group are not calculated using any of the data.

7. The method of claim 1, wherein the grid comprises a plurality of rows, wherein a location of a parity value from the Row P Parity Group in a first row of the plurality of rows is in a different relative location as compared to a location of a parity value from the Row P Parity Group in a second row of the plurality of rows.

8. The method of claim 1,
wherein the grid comprises a plurality of rows, wherein a row of the plurality of rows in the grid is associated with at least one parity value from the Row P Parity Group and the Row Q Parity Group;
wherein the grid comprises further comprises a plurality of columns, wherein a column of the plurality of columns in the grid is associated with at least one parity value from the Column P Parity Group and the Column Q Parity Group.

9. The method of claim 8,
wherein at least one of the plurality of rows only consists of parity values from the Row P Parity Group and the Intersection Parity Group; and
wherein at least one of the plurality of rows only consists of parity values from the Row Q Parity Group and the Intersection Parity Group.

10. A system, comprising:
a controller;
a memory operatively connected to the controller;
a non-transitory computer readable medium operatively connected to the controller;
a storage array operatively connected to the controller and comprising a plurality of storage modules;
wherein the non-transitory computer readable medium comprises instructions which when executed by the controller performs a method, the method comprising:
receiving data to write to the storage array;
in response to the receiving, temporarily storing the data in a grid in the memory until parity values associated with the data are calculated;
calculating the parity values for the grid using the data, wherein the grid comprises a data grid and a parity portion;
wherein the grid comprises a plurality of grid locations,
wherein a first portion of the grid locations is associated with the data grid;
wherein a second portion of the grid locations is associated with the parity portion;
wherein each of the plurality of grid locations is associated with a physical location in the storage array, wherein each physical location in the storage array is associated with a tuple specifying at least two independent fault domains in the storage array;
wherein the parity portion comprises a Row Q Parity Group, a Row P Parity Group, a Column Q Parity Group, a Column P Parity Group, and an Intersection Parity Group,
wherein each of the parity values is associated with one selected from a group consisting of the Row Q Parity Group, the Row P Parity Group, the Column Q Parity Group, the Column P Parity Group, and the Intersection Parity Group, and
wherein the parity values associated with the Intersection Parity Group are calculated using the parity values from at least one selected from a group consisting of the Row Q Parity Group, the Row P Parity Group, the Column Q Parity Group, and the Column P Parity Group;
after the parity values are calculated:
writing the data that is stored in the memory to the first portion of the grid locations,
wherein each of the grid locations associated with the first portion of the grid locations comprises a portion of the data,
wherein writing the data to the first portion of the grid locations comprises using the tuples associated with the first portion of the grid locations; and
writing the parity values for the grid to the second portion of the grid locations,
wherein the grid locations in the second portion of the grid are associated with physical locations in the storage array associated with the Row Q Parity Group, the Row P Parity Group, the Column Q Parity Group, the Column P Parity Group, and the Intersection Parity Group,
wherein writing the parity values to the second portion of the grid locations comprises using the tuples associated with the second portion of the grid locations.

11. The system of claim 10, further comprising:
a field programmable gate array (FPGA) operatively connected to the controller,
wherein calculating at least one of the parity values using the data comprises using the FPGA to calculate at least one of the parity values.

12. The system of claim 10, wherein the controller stores a grid geometry for the grid.

13. The system of claim 12, wherein the grid geometry comprises a size of the grid and specifies the at least two independent fault domains associated with the grid.

14. The system of claim 13, wherein a first independent fault domain of the at least two independent fault domains is the plurality of storage modules and a second independent fault domain of the at least two independent fault domains is a plurality of channels in each of the plurality of storage modules.

15. The system of claim 10, wherein the controller is configured to track locations of parity values in the grid.

16. The system of claim 10, wherein the controller is configured to reconstruct a corrupted datum in the storage array using the parity values in the Intersection Parity Group.

17. The system of claim 10, wherein at least one physical location in the portion of the grid is associated with a first independent fault domain and a second independent fault domain.

18. The system of claim 10, wherein the grid comprises a plurality of rows, wherein a location of a parity value from the Row P Parity Group in a first row of the plurality of rows is in a different relative location as compared to a location of a parity value from the Row P Parity Group in a second row of the plurality of rows.

19. The system of claim 10,
wherein the grid comprises a plurality of rows, wherein a row of the plurality of rows in the grid is associated with at least one parity value from the Row P Parity Group and the Row Q Parity Group;
wherein the grid comprises further comprises a plurality of columns, wherein a column of the plurality of columns in the grid is associated with at least one parity value from the Column P Parity Group and the Column Q Parity Group.

20. The system of claim 19,
wherein at least one of the plurality of rows only consists of parity values from the Row P Parity Group and the Intersection Parity Group; and
wherein at least one of the plurality of rows only consists of parity values from the Row Q Parity Group and the Intersection Parity Group.

\* \* \* \* \*